United States Patent [19]

Sekutowski

[11] Patent Number: 4,740,538

[45] Date of Patent: Apr. 26, 1988

[54] COATED MINERALS FOR FILLING PLASTICS

[75] Inventor: Dennis G. Sekutowski, Stockton, N.J.

[73] Assignee: Engelhard Corporation, Menlo Park, N.J.

[21] Appl. No.: 891,980

[22] Filed: Jul. 3, 1986

[51] Int. Cl.⁴ .......................... C08K 5/54; C08K 3/34
[52] U.S. Cl. ..............................,.... 523/205; 106/308 Q; 106/308 N; 106/308 M; 523/209; 523/212; 523/213; 523/214; 524/606; 524/605; 524/604
[58] Field of Search ............... 523/205, 209, 212, 213, 523/214; 106/308 Q, 308 N, 308 M

[56] References Cited

U.S. PATENT DOCUMENTS

| | | | |
|---|---|---|---|
| 3,619,229 | 11/1971 | Hartlein | 523/209 |
| 3,647,743 | 3/1972 | Nagamatsu et al. | 523/209 |
| 3,962,172 | 6/1976 | Wurmb et al. | 523/209 |
| 4,071,494 | 1/1978 | Gaylord | 523/205 |
| 4,091,164 | 5/1978 | Schwarz | 523/205 |
| 4,467,055 | 8/1984 | Machurat et al. | 523/212 |
| 4,478,963 | 10/1984 | McGarry | 523/205 |
| 4,551,485 | 11/1985 | Ragan et al. | 523/212 |
| 4,574,131 | 3/1986 | Theysohn et al. | 523/209 |

*Primary Examiner*—Lewis T. Jacobs
*Attorney, Agent, or Firm*—Inez L. Moselle

[57] ABSTRACT

A filled engineering plastic is provided with improved impact strength by pretreating the filler to provide separate coating deposits of a coupling agent and an impact modifier for the plastic matrix. For a nylon plastic composite, a kaolin filler coated with separate deposits of an amino functional silane coupling agent and a phenol or triethanolamine impact modifier has resulted in an improved impact strength without sacrificing tensile and elastic properties of the nylon.

35 Claims, No Drawings

COATED MINERALS FOR FILLING PLASTICS

FIELD OF THE INVENTION

This invention is directed to novel coated fillers for engineering plastics, i.e. moldable plastic compositions, and to filled plastic compositions and articles molded therefrom. More particularly, the invention is concerned with coated fillers for improving the impact strength of engineering plastics.

BACKGROUND OF THE INVENTION

Recently, moldable plastic materials of improved mechanical properties have been molded into component parts which have increasingly replaced heavier metal components in a myriad of commercial goods and applications. Among the most important and widely used engineering plastics are thermoplastic materials of which polyamides, i.e. nylon, polyesters, i.e polyalkylene terephthalates, and wholly aromatic polyesters such as formed by reaction of aromatic dicarboxylic acids with bisphenols can be mentioned.

It is well known that engineering plastics may be filled with inorganic fillers and other substances to form uniform compositions. Reinforcing fillers of various sizes, shapes and amounts have been incorporated into plastics for a variety of purposes, which include opacification and coloration, increase in abrasion resistance, modification of thermal expansion and conductivity, improvements in mechanical properties such as tensile and flexural properties. However, in general, the addition of even minor amounts of these fillers to moldable plastics has often had a deleterious effect on the impact strength of the moldable plastic. Moreover, high filler loadings have adversely affected other physical and mechanical properties as well.

Attempts have been made to enhance the mechanical properties of filled plastic compositions. For example, coupling agents have been added to the filled plastic compositions in order to more readily adhere the filler to the polymer or aid in dispersing the filler uniformly in the polymer matrix. Among patents which disclose the addition of coupling agents to filled engineering plastic compositions include U.S. Pat. Nos. 3,290,165; 3,419,517; 3,833,534; and 4,528,303.

While filled engineering plastic compositions containing coupling agents can be compounded to exhibit a high modulus of elasticity, strength, and heat distortion temperature, it is always desirable to improve the performance level of any composition. In the case of the filled thermoplastic nylon or polyester compositions, for example, one area where improvement is particularly desirable is still in the area of impact strength and, in particular, multiaxial impact strength such as "falling weight impact" which is a modified, and often better, indication of "on the job" performance than the uniaxial impact strength measured by Izod impact.

It is known that the impact strength of filled plastic compositions may be increased by such methods as the incorporation of an impact modifier in the plastic phase or, filled plastic compostions with improved impact may be formulated by selecting for use polymers which have inherent impact strength. However, the improvement in impact strength thus obtained for any given plastic composition is inevitably obtained at the expense of a decrease in other important mechanical properties such as the modulus of elasticity. Attempts have been made to overcome such deficiency, for example, as disclosed in U.S. Pat. No. 4,399,246 wherein a filled polyamide composition of improved falling weight impact resistance has incorporated therein an aminofunctional silane coupling agent and an N-substituted hydrocarbonyl sulfonamide. Because of the typical variable compounding capacity of engineering plastic compositions, it is possible to extend the useful range of application of these compositions by tailoring them to suit a particular use. For example, filled prior art compositions ranging from those for applications requiring moderate impact strength but not a high modulus of elasticity, to those for applications requiring high modulus but for which good impact strength is not necessary, may be formulated by the inclusion or exclusion of impact modifier, the increase or decrease in the amount of filler, and the proper selection of the matrix polymer. It should be recognized, however, that although this ease of "tailoring" prior art compositions to the requirements of a particular application is a fortunate advantage, it is basically a property-balancing compromise indicating a need for higher performance materials with the cost and fabrication advantages of the prior art filled polymer compositions.

As previously mentioned, treated fillers or, in particular, fillers coated or mixed with coupling agents have been incorporated into moldable plastics to enhance the mechanical properties of the molded composites. There is a large quantity of art related to modifying the physical and mechanical properties of molded plastic compositions by altering the surface of fillers by chemical treatment such as by providing a coating thereon and incorporating such coated fillers into the moldable plastic matrix. The present invention is concerned with and the primary object thereof is improving the mechanical properties, in particular, the impact strength of filled plastic compositions without unduly sacrificing the other mechanical properties by incorporating therein a novel treated filler. Another object is to provide a novel treated filler and method of making same.

These as well as other objects and aspects of the invention will become clear to those of ordinary skill in the art upon consideration of the foregoing specification and appended claims.

SUMMARY OF THE INVENTION

In accordance with the present invention, inorganic fillers are provided with separate deposits of an impact modifier for the plastic and a coupling agent. Molded parts obtained from plastics having incorporated therein the plural coated fillers of the present invention have vastly improved impact strength over parts obtained from previously known filled plastic compositions while retaining the improvements in other mechanical properties, such as tensile strength.

Surprisingly, it has been found that only when the inorganic filler is coated with separate deposits of the impact modifier and coupling agent are the results of improved impact strength found. Thus, fillers coated with a mixture of the impact modifier and coupling agents or moldable plastic compositions containing the filler, coupling agent and impact modifier all separately dispersed with the base polymer yield molded articles which do not have the impact strength found as a result of incorporating into the moldable plastic the inorganic fillers treated in accordance with the present invention.

In the instant invention, an inorganic filler is coated with separate deposits in which one comprises 0.1–5 wt.% of any impact modifier known to improve the impact strength of the virgin polymer to be molded and the second comprises 0.1–5 wt.% of a coupling agent such as an aminosilane used to improve the adhesion of the filler to the polymer phase.

The amount of inorganic filler present in the composition is not narrowly critical and the amounts conventionally employed in the art are suitable. Typical amounts include 2–55 volume percent based on the filled plastic composition. The inorganic fillers are coated separately with the impact modifying and coupling agents, in either order of application, and the plural coated fillers are then blended or otherwise dispersed within the polymer matrix prior to molding into the desired configuration.

DETAILED DESCRIPTION OF THE INVENTION

The polymer matrix which is to be filled by the novel treated filler of the present invention can be any of the known moldable plastic materials either thermosetting or thermoplastic. Thermoplastic resins are preferred and among these which have been molded and found wide use as component parts in place of previously used metal components are the polyamides and aromatic polyesters. Also useful are vinyl thermoplastic polymers such as polyethylene, polypropylene, polyvinyl halides, aromatic vinyls such as styrenic polymers, acrylonitrile-butadiene-styrene copolymers (ABS), acrylic polymers, etc. A more specific description of useful engineering plastics is given below.

The polyamide matrix useful in this invention is well known in the art and embraces those semi-crystalline and amorphous resins having a number average molecular weight of at least 5000 and commonly referred to as nylons. Suitable polyamides include those described in U.S. Pat. Nos. 2,071,250; 2,071,251; 2,130,523; 2,130,948; 2,241,322; 2,312,966; 2,512,606; and 3,393,210. Preferably, the polyamide is one that is produced by condensation of equimolar amounts of a saturated dicarboxylic acid containing from 4 to 12 carbon atoms with a diamine, in which the diamine contains from 4 to 14 carbon atoms. Preferably, both the diacid and diamine are saturated aliphatic diacids and diamines. Excess diamine can be employed to provide an excess of amine and groups over carboxyl end groups in the polyamide. Examples of polyamides include polyhexamethylene adipamide (66 nylon), polyhexamethylene azelamide (69 nylon), polyhexamethylene sebacamide (610 nylon), polyhexamethylene dodecanoamide (612 nylon), and the polyamides produced by ring opening of lactams, i.e., polycaprolactam (6 nylon), poly-11-aminoundecanoamide (nylon-11), bis(paraominocyclohexyl) methane dodecanoamide (nylon 12). Also useful in this invention are polyamides prepared by the copolymerization of two of the above polymers or their components, e.g., for example, an adipic, isophthalic acid hexamethylene diamine copolymer. Mixtures of polyamides can also be used.

Another thermoplastic resin which has found extensive use as an engineering plastic for molded components are linear polyesters such as the linear, high polymerized esters of terephthalic acid and polymethylene glycols having from 2 to 10 methylene groups. Such polymers, in general, are described in U.S. Pat. No. 2,465,319 to Whinfield and Dickson, herein incorporated by reference. The polyesters are produced by reacting glycols of the series $HO(CH_2)_nOH$, wherein n is an integer within the range of 2 to 10, with terephthalic acid or a dialkyl ester of terephthalic acid (especially dimethyl terephthalate). The most widely used of these polyesters are polyethylene terephthalate and polybutylene terephthalate.

Linear polyesters which have many desirable physical and chemical properties are the wholly aromatic polyesters, i.e. polyarylates. The polyarylates are obtained from reacting terephthalic acid and/or isophthalic acid with a bisphenol. Derivatives of terephthalic or isophthalic acid can also be used and include acid halides, dialkyl esters and diaryl esters. Examples of acid halides include terephthaloyl dichloride, isophthaloyl dichloride, terephthaloyl dibromide and isophthaloyl dibromide. Examples of dialkyl esters include dialkyl esters of terephthalic and isophthalic acids containing 1 to 6 (especially 1 to 2) carbon atoms in each alkyl moiety thereof. Examples of diaryl esters include diphenyl terephthalate and diphenyl isophthalate. The most typically used and readily available bisphenol is bisphenol-A.

Other thermoplastic resins which can be filled by the novel filler of this invention include polyolefins such as high-density and low-density polyethylene, polypropylene, and ethylene-propylene copolymers; polyvinyl chloride and copolymers thereof; polycarbonates such as those resulting from the reaction of phosgene with dihydroxylated aromatic compounds such as bisphenol-A; and thermoplastic polyurethanes.

The polymers which are filled according to the present invention can also be synthetic thermosetting materials which, under the action of heat, begin by softening (if they are not already in the soft form) and then gradually harden and transform into a solid state, which they will retain indefinitely. These thermosetting materials include, for example; phenolic resins; unsaturated polyesters; epoxy resins; polyamides; and crosslinked polyurethanes.

Preferred classes of thermosetting polymers useful in the subject compositions are phenolic resins and polyamides. By the term "phenolic resins", there is essentially intended the products obtained by the polycondensation of aldehydes and phenols. Examples of representative species of such phenolic resins are condensates of phenol, resorcinol, cresol or xylencol and formaldehyde or furfural. By the term "polyamides", there is essentially intended the products obtained by reacting an unsaturated dicarboxylic acid, N,N'-bis-imide with a primary polyamine. Products of this type are described in French patent No. 1,555,564, in U.S. Pat. Nos. 3,562,223, and 3,658,764 and in U.S. Pat. No. Re. 29,316. A particularly representative example is the product obtained by reacting N,N'-4,4-dipehnylmethanebis-maleimide with 4,4'-diaminodiphenylmethane.

The fillers which are useful in accordance with the present invention are those materials which are non-polymerizable, discrete particles which are capable of existing and remaining in a discontinuous phase when placed in the presence of a polymer or polymerizing monomer and subjected to processing conditions necessary to shape the composite into a solid finished article.

Inorganic filler materials useful herein can be selected from a wide variety of minerals, metals, metal oxides, metal salts such as metal aluminates and metal silicates, other siliceous materials including glass and mixtures thereof. More specifically, materials particularly preferred as fillers which can be coated in accordance with the present invention include wollastonite, which is a calcium metasilicate; mullite, an aluminum silicate; calcium magnesium silicates; and an acicular aluminum silicate, $Al_2SiO_5$. Other useful inorganics which can be converted into filling agents include quartz and other forms of silica such as silica gel, carbon black, graphite, cristobalite, calcium carbonate, etc.; metals such as aluminum, tin, lead, magnesium, calcium, strontium, barium, titanium, zirconium, vanadium, chromium, manganese, iron, cobalt, nickel, copper and zinc; metal oxides or hydroxides in general such as alumina trihydrate; oxides of aluminum, tin, lead, magnesium, calcium, strontium, barium, titanium, zirconium, vanadium, chromium, manganese, iron, cobalt, nickel, copper, antimony and zinc; heavy metal phosphates, sulfides, and sulfates, and minerals such as spodumene, mica, montmorillonite, kaolinite, bentonite, hectorite, beidellite, attapulgite, chrysolite, garnet, saponite, and hercynite. Metal coated glass and clays are also useful fillers.

Particularly preferred fillers are those inorganic siliceous materials including hydrated or anhydrous silicas, calcium silicates, calcium-magnesium silicates, barium silicates, sodium-alumino-silicates, calcium-alumino-silicates, calcium-sodium-alumino silicates; clays (aluminum silicates) such as halloysite, montmorillonites including sodium and magnesium bentonites; synthetic or natural zeolites; and synthetic or natural talcs (magnesium silicates). Especially preferred inorganic fillers are the calcined kaolins which include dickite kaolinite, nacrite and some halloysites.

Fibrous fillers are also useful including glass fibers, graphite fibers, metal carbide fibers, carbon fibers, aramid fibers (Kevlar ®), boron fibers, metal coated glass fibers, PAN fibers, ceramic fibers, etc. As in known in the art, mixtures of fillers can be used. Types of mixtures would include fiber glass and minerals, glass beads or wollastonite.

In one aspect of this invention, it is preferred that the inorganic filler have a very fine particle size, e.g., below 1 micron equivalent spherical diameter (esd) and substantially free from particles larger than 10 microns (esd).

Such fine particle size materials are usually difficult to disperse in a plastic or resin. Without proper dispersion, the impact strength of the composite is greatly lowered. However, using fine calcined Kaolin with the described separate deposits of impact modifier and coupling agent will yield a composite with noticeable impact benefit. A preferred finely divided kaolin is Satintone ® 5 marketed by Engelhard Corporation.

The fillers of this invention are provided with separate deposits comprising respectively a coupling agent and an impact modifier. The expression "separate deposits" is intended to include a partial interaction of the impact modifier and coupling agent after they have been applied as separate deposits to the inorganic filler.

The coupling agent is typically selected from among the polyfunctional organosilicon compounds. Typical compounds contain at least one alkoxysilane group capable of interacting with the inorganic filler or fillers and at least one other group capable of interacting with the polymer. The nature of this other functional group will of course depend upon the polymer used. Thus, coupling agents containing vinyl groups are compounds which can be used, for example, with polyolefins and thermosetting polyesters; examples of suitable organosilicon compounds are: vinyltrimethoxysilane, vinyltriethoxysilane and vinyltri-(2-methoxyethoxy)-silane.

Coupling agents containing acrylic or methacrylic groups are also compounds which can be used with polyolefins and thermosetting polyesters; an example of such a suitable organosilicon compound is: γ-methacryloxypropyltrimethoxysilane. Amino coupling agents are compounds which can be used, for example, with polyvinyl chloride, polyamides, thermoplastic polyesters, polycarbonates, thermoplastic polyurethanes, phenolic resins, epoxy resins and polyamides; examples of such suitable organosilicon compounds are: γ-aminopropyltrimethoxysilane, γ-aminopropyltriethoxysilane and N-(β-aminoethyl)-γ- aminopropyltrimethoxysilane. Epoxidized coupling agents are also compounds which can be used with thermoplastic polyesters, phenolic resins and epoxy resins examples of suitable such organosilicon compounds are: β-(3 4-epoxycyclohexyl)-ethyltrimethoxysilane and γ-gycidoxypropyltrimethoxysilane. Coupling agents containing mercapto groups are compounds which can be used, for example, with polychloroprenes; an example of a suitable such organosilicon compound is: γ-mercaptopropyltrimethoxysilane. Azidosilanes (or silanesulfonylazides) are also suitable as coupling agents; compounds of this type are described by G. A. McFarren et al, in the article: *Polymer Engineering and Science*, 17, No. 1, pages 46 to 49 (1977).

For use with the preferred polyamide and polyester thermoplastic resins as described above are coupling agents comprising aminosilane compounds depicted by the following formula:

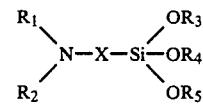

$R_1$ is hydrogen, alkyl, aryl, cycloalkyl, or alkylaryl; $R_2$ is hydrogen, alkyl, aryl, cycloalkyl or alkylaryl; $R_3$ is hydrogen, lower alkyl, aryl, lower alkylaryl, or lower arylalkyl; $R_4$ is hydrogen, lower alkyl, aryl, lower alkylaryl or lower arylalkyl; $R_5$ is hydrogen, lower alkyl, aryl, lower alkylaryl or lower arylalkyl; and X is alkylene, arylene, alkylarylene, arlalkylene, cycloalkylene having secondary and/or tertiary nitrogen present in the chain, and/or primary secondary, and/or tertiary nitrogen pendant from the chain. Some of these amino organosilanes are disclosed along with methods for their preparation in U.S. Pat. Nos. 2,832,754; 2,930,809; 3,007,957; and 3,020,301. Commercially available aminoorganosilanes include "A-1100" (gamma aminopropyltriethoxysilane) sold by Union Carbide Corporation, New York, N.Y. and "Z-6020" (a diamino functional silane) sold by Dow Corning Corporation, Midland, Mich., or "A-1120" (a diamino functional silane) sold by Union Carbide Corporation.

Other coupling agents which are useful in the invention include silanes with 1 or 2 leaving groups.

For nylon, one can use aluminozirconate and organotitanates such as isopropyl tri(dioctylpyrophosphato)titanate, isopropyl tri(N ethylamino-ethylamino)-titanate.

The fillers useful in the present invention are also provided with an agent known to provide improved impact strength to the plastic which is filled. Thus, for a particular plastic material there is typically known many substances which improve the impact strength of the plastic. Thus, the impact modifiers which are coated on the fillers are those substances which improve impact strength such as uniaxial impact strength measured by Izod impact, but, more preferably are impact modifiers which improve the multiaxial impact strength such as measured by Gardner impact.

For example, the impact strength of the various nylons is known to be increased by the incorporation of a plasticizer into the polyamide phase.

As examples of plasticizers or modifying agents which are particularly suited as impact modifiers for incorporation onto the mineral fillers by the process of this invention may be mentioned acids such as succinic, glutaric, alpha-methyladipic, beta-methyladipic, diglycolic, hydroxybutyric, stearic, palmitic, tetrahydrofuroic, hydroxyvaleric, glyceric, benzoic, o-benzoylbenzoic, diphenic, abietic, camphoric, bis-sulfondiacetic, and drying oil acids. Also well adapted to the process of this invention are sulfonamides such as p-toluenesulfonamide, N-ethyl-p-toluenesulfonamide, mixtures of N-butyl-o- and -p-toluenesulfonamides, N-dibutyl-p-toluenesulfonamide, N-benzoyl-p-toluenesulfonamide, propylbenzenesulfonamide, N-ethyl-p-propylbenzene-sulfonamide, amylbenzene sulfonamide, N-ethyl-p-amylbenzenesulfonamide, N-diethyl-p-amylbenzenesulfonamide, decylbenzenesulfonamide, cyclohexanesulfonamide, cyclohexane-1,4-disulfonamide, N-isobutylcyclohexanesulfonamide, N-phenylcyclo hexanesulfonamide, N-dimethylcyclohexanesulfonamide, N-ethylbenzenesulfonamide, naphthalenesulfonamide, and N-ethylnaphthalenesulfonamide. As examples of phenols which are particularly adapted to the process may be mentioned resorcinol, hexylphenol, octylcatechol, o- and p-phenylphenols secondary hexyl-2-chloro-4-hydroxytoluene, cyclohexylphenol, amylphenol, diamylphenol, hexylresorcinol, octyl-beta-naphthol, beta-naphthol, hydroquinone, salicylic acid, salicylic acid esters, phenolphthalein, o-hydroxydiphenyl and diphenylolpropane. As examples of plasticizers which may be incorporated in polyamides by the process of this invention, though less advantageously than the three classes of plasticizers noted above, may be mentioned dimethyl phthalate, dimethyl sebacate, dimethyl adipate, tricresyl phosphate, dibutyl phosphate, ethyl palmitate, aluminum palmitate, aluminum stearate, hexamethylene diacetamide, chlorinated hydrocarbons, chlorinated ethers, and cyclic ketones. The most effective plasticizers have boiling points above 200° C. and preferably above 250° C. The most preferred plasticizers added as impact modifiers are the phenols as described above and aminoalcohols such as triethanolamine.

There are many other known impact modifiers for polyamides and much prior art concerned with improving the impact strength of polyamides. Among polymeric impact modifiers are those disclosed in British Pat. No. 998,439, for example, which discloses an impact modifier comprising olefin copolymers, the olefin copolymer containing acid groups. Many olefin copolymers are disclosed and contain at least 50 mole percent and preferably 80% of an 1-olefin such as ethylene, propylene, butene-1, isobutene, pentene-1, hexene-1, decene-1, 4-methylbutene-1, 4-methylpentene-1, 4,4-dimethyl pentene-1, vinylcyclohexane, styrene, α-methyl styrene or styrenes substituting with alkyl substituents. Generally speaking, the olefins preferably contain from 2 to 10 carbon atoms, since such olefins are generally more readily available than the high olefins. Mixtures of olefins may be employed. The acidic components are preferably α,β-unsaturated monocarboxylic acids, such as acrylic acids, methacrylic acid or ethacrylic acid. Murch U.S. Pat. No. 3,845,163 and Epstein U.S. Pat. No. 4,174,358 disclose an acid-containing olefin polymer such as those described in British Pat. No. 998,439 in which the acid is derived from an α,β-ethylenically unsaturated carboxylic acid and in which at least 10 percent of the acid groups have been neutralized with metal ions. Owens et al U.S. Pat. No. 3,668,274 discloses modestly improved impact strength of polycarbonamides modified with (A) a first elastomer phase of copolymers or terpolymers and (B) a final rigid phase thermoplastic stage containing amine-reactive moieties, preferably carboxylic acid groups.

U.S. Pat. No. 4,467,057 discloses an impact modifier comprising a combination of (i) a selectively hydrogenated monoalkenyl arene-diene block copolymer resin and (ii) an aromatic polycarbonate. The block copolymer resins (i) can be made in known ways and they are available commercially from Shell Oil Company, under the trade designation Kraton, and from Phillips Chemical Co., under the trade designation Solprene. Resins in U.S. Pat. No. 4,090,996 can be used, especially those containing units in the linear ABA structure or in the radial A-B-A teleblock structure, derived from styrene and butadiene or isoprene. Especially preferably, the block copolymer will comprise a selectively hydrogenated block copolymer of styrene and butadiene, the butadiene having a 1,2 content of between about 35% and 55%. The polycarbonate resins (ii) can be made in known ways and they are available commercially from sources, e.g., General Electric Company, Pittsfield, Mass., U.S.A., under the trademark LEXAN. In general, any of the aromatic polycarbonates described in Baron et al, U.S. Pat. No. 4,034,016 can be used, especially those including units derived from bisphenol-A.

British patent No. 998,439 and U.S. Pat. Nos. 3,845,163; 3,174,358; 3,668,274; and 4,467,057 are herein incorporated by reference.

One particular type of impact modifier which has been suggested for thermoplastic polymers and is of use in the present invention is a multiphase composite interpolymer, designated "Acryloid" and marketed by Rohm and Haas Company, Philadelphia, Pa., for use as an impact modifier for polyesters, polyvinylchlorides and nylons. The following three patents disclose "Acryloid" impact modifiers.

U.S. Pat. No. 4,096,202 of Farnham et al specifically discloses the use of a multiphase composite interpolymer as an impact modifier for polyalkylene terephthalate, i.e. thermoplastic polyesters. The multiphase composite interpolymer is described as a cross-linked acrylic first stage containing a graft-linking monomer and a final rigid thermoplastic phase. According to Rohm and Haas Company, the multiphase composite polymer described in this patent is designated commercially as Acryloid KM-330. U.S. Pat. No. 4,034,013 also discloses a composition of an impact modifier for polyalkylene terephthalates wherein the impact modifier comprises a multi-stage polymer having a rubbery first stage and an epoxy functional hard final stage. The rubbery polymer suitable for the core or first stage includes polymers of one or more of butadiene or acrylates. The first stage monomer can include a graft linking monomer and a cross linking monomer. U.S. Pat. No. 4,180,494 discloses an impact modifier comprising an aromatic polycarbonate and a core shell polymer having a butadiene-based core, a second stage polymerized from styrene and a final stage or shell polymerized from methyl methacrylate and 1,3-butylene glycol dimethacrylate. Aromatic polyesters such as polyalkylene terephthalate and Bisphenol A isophthalate can be improved by the impact modifier. These three preceding patents are herein incorporated by reference.

An impact modifier for polyarylate is disclosed in U.S. Pat. No. 4,281,079 and comprises an elastomeric ethylene 1-alkene copolymer. The elastomeric ethylene 1-alkene copolymer is a copolymer of ethylene and propylene or 1-butene containing about 30 to 70% by weight ethylene and about 70 to 30% by weight propylene or 1-butene. The co-monomer is preferably propylene. The copolymers can be produced by conventional methods using coordinate polymerization catalysts such as those of the Ziegler Natta type. The monomers are randomly distributed in the copolymers and there is little block structure since the degree of crystallinity is ordinarily in the range of about 0 to 3%. The melt index is generally in the range of about 0.1 to about 10 g/10 min. Optionally, the ethylene copolymer may include a diolefin monomer which introduces unsaturated side groups. Preferred diolefins are $C_5$ to $C_{10}$ nonconjugated dienes containing isolated double bonds and include 1,4-pentadiene, 2-methyl-1,4-pentadiene, 1,4-hexadiene, 1,5-hexadiene, 2-methyl-1,5-hexadiene, dicyclopentadiene, norbornadiene, methylenenorbornene, and 1,5-cyclooctadiene. In general, the third monomer is present in the copolymer as a minor component usually less than about 10% by weight and more preferably less than about 5% by weight, and is randomly distributed throughout the copolymer.

Another impact modifier suitable for polyarylates is disclosed in U.S. Pat. No. 4,231,922 and comprises a graft copolymer of a vinyl aromatic, an acrylate, and unsaturated nitrile, or mixtures thereof, grafted onto an unsaturated elastomeric backbone and having a tensile modulus (as measured by ASTM D-638, except that the test piece is compression molded to a 20 mil thickness) of less than about 100,000 psi, and preferably from about 15,000 to less than about 100,000 psi. The unsaturated elastomeric backbone may be polybutadiene, poly(-butadiene-co-styrene), poly(-butadiene-co-acrylonitrile), or poly(isoprene). In each of the polymers there is sufficient butadiene to give the polymer a rubbery character. The constituents which are grafted onto the unsaturated elastomeric backbone are selected from a vinyl aromatic, such as styrene, alphamethylstyrene, alkylstyrene, or mixtures thereof; an acrylate such as the acrylic ester monomers, such as methyl acrylate, ethyl acrylate, butyl acrylate, methyl methacrylate, or mixtures thereof; an unsaturated nitrile such as acrylonitrile, methacrylonitrile, or mixtures thereof. It will be understood that the vinyl aromatic, acrylate and acrylonitrile may be used individually or in any combinations in grafting onto the unsaturated elastomeric backbone. U.S. Pat. Nos. 4,281,079 and 4,231,922 are herein incorporated by reference.

The impact modifier and coupling agent are coated onto the filler in amounts ranging from about 0.1 to 5 wt.%, respectively, based on the weight of the filler. More preferably, amounts of about 0.2 to about 1.5 wt.%, respectively, of the impact modifier and coupling agent are sufficient to provide improved impact strength.

The filled plastic compositions according to the present invention can be prepared in various fashions which are in and of themselves known to the art. Importantly and, quite surprisingly, it has been found that the coupling agent and the impact modifier such as described above must be applied separately and as separate deposits upon the filler prior to incorporation into the polymer to achieve the improvement in impact strength without adversely affecting the other mechanical properties of the filled engineering plastic. Thus, according to the present invention, a coating deposit of either the coupling agent or impact modifier is provided on the filler, and a subsequent coating deposit of the other treating agent is then applied. Thus, the filler contains separate deposits. Although the order of coating cannot be considered critical, it has been found that the better results are obtained when the filler is first coated with the impact modifier and subsequently coated with a layer of the coupling agent.

The filler may be coated by any conventional coating process such as by spraying the treating agents onto the filler, or immersing the filler in a bath of the treating agents or the like known coating processes. Preferably, the treating agents, in liquid form whether as a natural liquid, as a melt, or dissolved in a solvent, are sprayed upon the filler which is agitated using known commercial mixing equipment. If the treating agent is dissolved in a solvent, it is preferred to allow the solvent to be driven off prior to treating the filler with the subsequent treating material in order to obtain the substantially separate coating deposits. As indicated earlier, in some cases there may be a partial interaction between the impact modifier and the coupling agent.

When using finely divided calcined clays as the filler, it is preferred that the material be pulverized so as to prevent the presence of any agglomerates which may have been formed during the coating procedure. Commercially available pulverizers can be used.

The coated fillers are then mixed with the engineering plastic in two stages in which the first stage involves incorporating the coated filler into the plastic such as from the feed hopper of an extruder and secondly agitating the coated filler with the plastic at elevated temperatures in a single screw or multiscrew extruder. Preferably, the coated filler is added downstream along the barrel of the extruder into the melted polymer. After this treatment, the compositions are generally in the form of rods, which are then chopped into granules and the granules subsequently used to form the desired ultimate shaped articles in conventional injection molding, transfer molding or extrusion molding apparatus.

Unlike the prior art, which has generally considered as equivalents processes of mixing the coupling agent with the filler prior to incorporation with the polymer; mixing the coupling agent with the polymer prior to adding the filler; and mixing the filler, polymer and coupling agents at a single time, or in the case when several agents are used to treat the filler, mixing such agents together prior to coating the filler as disclosed in U.S. Pat. No. 4,399,246, the process of the present invention has found that the improved impact strength without deteriorating other mechanical properties of the polymer is achieved only by pretreating the filler to provide the separate layers of coupling agent and impact modifier before incorporation into the polymer such as by conventional mixing techniques.

Another method for the preparation of the compositions of the invention consists of polymerizing the monomers forming the polymer in the presence of the plural coated filler of the present invention, it being possible for the polymerization to take place either during the mixing of the coated filler with the monomers in the extruder or other mixing equipment or may take place in the mold having the shape of the desired article.

The engineering plastic according to the invention can also contain one or more conventional additives, such as, for example, pigments, stabilizers, nucleating agents, hardening or vulcanization accelerated, modifiers of flow characteristics, and compounds for improving the surface finish of the articles or for modifying the behavior of the compositions during molding. The amounts of these additives incorporated do not generally exceed about 40% of the weight of the polymer matrix.

In order to further illustrate the present invention and the advantages thereof, the following specific examples are given, it being understood that some are intended ples were then pulverized through a 0.020 inch screen, dried overnight at 140° F. and analyzed for C, H and N content. The coated fillers were compounded into the nylon with an American Leistritz (Sommerville, NJ) LSM 30.34GL co-rotating twin screw (34 mm) extruder at a barrel temperature ranging from about 200°–270° C. During extrusion, the coated filler was fed into the nylon melt rather than prefeeding the kaolin and pelletized nylon into the extruder throat. The mineral content was verified by ashing. The material was then injection molded into the test specimens which were stored under Argon.

The injection molding was carried out by introducing the extruded material as small pellets into a 1 ounce Arburg injection molding machine whose 3 zones are heated at the temperature set forth in Table 1.

TABLE 1

| SMPL | DESCRIPTION | Wt. % | MEQ | % ASH | GARDNER IMPACT (IN-LB) | % C | % H | % N |
|---|---|---|---|---|---|---|---|---|
| 1 | Silane[1] | 1.4 | — | 30.2 | 19 | 0.32 | 0.09 | 0.21 |
| 2 | Silane | 1.4 | — | 31.3 | 162 | 0.31 | 0.09 | 0.21 |
| 3 | Silane | 1.4 | — | 32.2 | 140 | 0.31 | 0.09 | 0.21 |
| 4 | Silane | 1.4 | — | 35.7 | 40 | 0.31 | 0.09 | 0.21 |
| 5 | Silane | 1.4 | — | 36.5 | 49 | 0.31 | 0.09 | 0.21 |
| 6 | Silane | 1.4 | — | 40.4 | 18 | 0.32 | 0.09 | 0.21 |
| 7 | Silane/SS* | 1.0 | — | 37.3 | 17 | 0.23 | 0.06 | 0.15 |
| 8 | Silane** | 1.6 | — | 33.0 | 13 | 0.38 | 0.12 | 0.28 |
| 9 | 1,6 Hexanediamine | — | 7 | 32.3 | 15 | 0.53 | 0.14 | 0.32 |
| 10 | Adipic Acid | — | 7 | 33.6 | 19 | 0.55 | 0.07 | 0.19 |
| 11 | 1,6 Hexanediamine | — | 14 | 33.3 | 12 | 0.80 | 0.18 | 0.40 |
| 12 | No Treatment | 0 | 0 | 34.6 | 8 | 0.05 | 0.05 | 0.15 |
| 13 | Morpholine | — | 7 | 35.4 | 9 | 0.25 | 0.09 | 0.19 |
| 14 | Morpholine/Silane | 1.1/ | 2 | 35.6 | 15 | 0.30 | 0.10 | 0.23 |
| 15 | Nylon 3/3 | 0.5 | — | 36.4 | 9 | 0.08 | 0.06 | 0.14 |
| 16 | Silane/Adipic Acid | 0.7/ | 5 | 34.2 | 29 | 0.54 | 0.13 | 0.17 |
| 17 | 6-Aminocaproic Acid | — | 7 | 28.9 | — | 0.54 | 0.10 | 0.25 |
| 18 | Silane/Triethanolamine | 1.0/ | 1.5 | 34.1 | 27 | 0.24 | 0.08 | 0.18 |
| 19 | Triethanolamine/Silane | 1.0/ | 1.5 | 33.1 | 223 | 0.32 | 0.07 | 0.25 |
| 20 | Al[2]/Triethanolamine | — | 7/3 | 32.8 | 17 | 0.18 | 0.06 | 0.15 |
| 21 | Al[2]/Aminocaproic Acid | — | 7/6 | 31.4 | 18 | 0.50 | 0.10 | 0.22 |
| 22 | Al[2]/Adipic Acid | — | 7/6 | 36.6 | 18 | 0.44 | 0.10 | 0.14 |
| 23 | Silane/Phenol | 1.0/ | 3 | 32.8 | 99 | 0.35 | 0.10 | 0.21 |
| 24 | Toluenesulfonamide | — | 3 | 33.7 | 11 | 0.07 | 0.05 | 0.15 |
| 25 | Al[2]/Triethanol-amine/Silane | 0.7/ | 3.5/5 | 35.6 | 24 | 0.32 | 0.10 | 0.22 |
| 26 | Poly(ethylenimine) 50% $H_2O$ | 2.0 | — | 33.9 | 12 | 0.52 | 0.14 | 0.44 |
| 27 | Al[2]/Adipic Amine/phenol | — | 5/4/3 | 35.8 | 12 | 0.48 | 0.07 | 0.16 |
| 28 | Silane, No Pulv. | 1.4 | — | 36.4 | 16 | 0.31 | 0.13 | 0.28 |
| 29 | Silane, No Pulv. | 1.4 | — | 38.3 | 16 | 0.34 | 0.11 | 0.34 |

Molding Conditions 500-500-450° F., Mold 80° C., 5.6 shot size
Pressure - injection - 1300 psi - back - 100 psi
Nylon 6 is Capron 8200HS (Allied Chemical)
Kaolin filler is Satintone #5 (Engelhard) unless otherwise indicated
*Kaolin filler is Satintone Special (Engelhard)
**Kaolin filler is Satintone #5 —3μ (Engelhard)
[1]All silanes are gamma aminopropyltriethoxysilane A-1100 or A-1102 (Union Carbide).
[2]Aluminum isopropoxide.
MEQ - milliequivalence of reagent per 100 grams of Kaolin
Gardner Impact - ASTM 3029-G (3" Disc) (mean failure energy)

only as illustrative and should not be construed so as to limit the invention as set out the appended claims.

EXAMPLE 1

Kaolin clay filler was coated with various coupling agents, impact modifiers, or both. Filled samples of nylon 6 were molded into test samples and the samples tested for Gardner impact strength. Molding conditions, the composition of the coated fillers, the mineral content, Gardner impact and chemical analysis of the coated fillers are set forth in Table 1.

Samples of the coated filler were prepared by dispersing the liquid reagents as a fine mist into a fluidized bed of kaolin in a liquid-solids V-Blender fitted with an intensifier bar supplied by Patterson-Kelley. The sam-

EXAMPLE 2

Various treated fillers were compounded into nylon 6 and tested for mechanical properties. The fillers were coated with various treating agents similar to the procedure used in Example 1 and the coated fillers collected and pulverized and analyzed for C, H and N content. Compounding the nylon composite and molding was as in Example 1. Table 2 sets forth the materials used to treat the fillers, amounts of each component and the filler content of the nylon composite as well as Gardner impact. Table 3 compares the Gardner impact, flexural modulus, Izod impact and tensile strength of some of the samples tested.

improved along with impact relative to the silane treated filler control.

TABLE 2

| SMPL | DESCRIPTION | Wt. % | MEQ | % ASH | GARDNER IMPACT (IN-LB) | % C | % H | % N |
|---|---|---|---|---|---|---|---|---|
| 1 | Silane[1] | 1.4 | 6.3 | 38.5 | 56 | 0.30 | 0.10 | 0.20 |
| 2 | Silane | 1.4 | 6.6 | 39.5 | 76 | 0.30 | 0.10 | 0.20 |
| 3 | Silane | 1.4 | 6.3 | 42.4 | 40 | 0.30 | 0.10 | 0.20 |
| 4 | Silane | 1.4 | 6.3 | — | — | 0.30 | 0.10 | 0.20 |
| 5 | Silane | 1.4 | 6.3 | 41.4 | 52 | 0.30 | 0.10 | 0.20 |
| 6 | Surface treated Kaolin[2] | — | — | 41.2 | 34 | 0.28 | 0.08 | 0.12 |
| 7 | Silane/Triethanolamine | 1.0/0.22 | 4.5/1.5 | 39.5 | 66 | 0.28 | 0.08 | 0.17 |
| 8 | Triethanolamine/Silane | 0.22/1.0 | 1.5/4.5 | 40.5 | 61 | 0.36 | 0.08 | 0.19 |
| 9 | Epoxy silane[3]/Hexylamine | 1.7/.71 | 7/7 | 41.2 | 12 | 1.06 | 0.18 | 0.17 |
| 10 | Epoxy silane[3]/Hexanediamine | 1.7/.81 | 7/7 | 40.3 | 24 | 1.07 | 0.21 | 0.23 |
| 11 | Triethanolamine/Silane | 0.45/1.0 | 3/4.5 | 41.5 | 71 | 0.38 | 0.06 | 0.15 |
| 12 | Epoxy silane[3]/1,3 Diaminopropane | 1.7/0.52 | 7/7 | 40.4 | 22 | 0.77 | 0.15 | 0.22 |
| 13 | Triethanolamine | 1.5 | 10 | 40.5 | 12 | 0.84 | 0.18 | 0.25 |
| 14 | Phenol/Silane | 0.28/1.0 | 3/4.5 | 39.0 | 70 | 0.35 | 0.06 | 0.18 |
| 15 | Silane-Premixed* | 1.4 | 6.3 | 40.3 | 61 | 0.28 | 0.07 | 0.17 |
| 16 | Sample 4, Refeed** | — | — | 37.8 | 41 | 0.30 | 0.10 | 0.20 |

Molding Conditions 500-500-450° F., Mold 80° C., 5.6 shot size
Pressure - injection - 1300 psi - back - 100 psi
Nylon 6 is Capron 8200HS (Allied Chemical)
Kaolin filler is Satintone #5 (Engelhard)
*Premixed 50%-In 90/10 ethanol and water Soln
**Refed to screw through empty nylon hopper
[1]All silanes are gamma aminopropyltriethoxysilane A-1100 (Union Carbide) unless otherwise indicated.
[2]Translink ® 445 (Engelhard)
[3](gamma-glycidoxypropyl)trimethoxysilane

TABLE 3

| SAMPLE # | ASH % | GARDNER (IN-LBS) | FLEXURAL MODULUS ($\times 10^3$-PSI) | IZOD (FT-LBS) GATE | IZOD (FT-LBS) DEAD | TENSILE (PSI) YIELD | TENSILE (PSI) BREAK |
|---|---|---|---|---|---|---|---|
| 1 | 38.5 | 56(4.2) | 625 | 63(11) | 62(13) | 11359 | 11352 |
| 3 | 42.4 | 40(1.8) | 853 | 44(16) | 35(10) | 13010 | 12948 |
| 5 | 41.4 | 52(2.3) | 771 | 40(13) | 33(10) | 12514 | 12514 |
| 6 | 41.2 | 34(7.8) | 741 | 24(8) | 10(3) | 11883 | 11855 |
| 7 | 39.5 | 66(12.2) | 807 | 40(12) | 34(13) | 12848 | 12697 |
| 8 | 40.5 | 61(3) | 815 | 39(15) | 31(10) | 12641 | 12610 |
| 11 | 41.5 | 71(9) | 819 | 43(20) | 38(10) | 12814 | 12810 |
| 14 | 39.0 | 70(27) | 798 | 54(15) | 45(14) | 12583 | 12582 |
| 15 | 40.3 | 61(14) | 819 | 51(17) | 32(6) | 13103 | 13066 |

Gardner ASTM - 3029-G
Flexural Modulus ASTM - D790
Izod ASTM - D256 (unnotched)
Tensile ASTM - D638

From Table 2 it can be seen that among the poorly performing treatments are those samples which involve coating the kaolin filler with a silane epoxide and a primary amine. Moreover, the sample which was fed through the extruder a second time yielded a reduced Gardner impact. Overall, the results show that impact modifiers for nylons such as phenol and triethanolamine when added to a filler which also contains the silane coupling or dispersing agent, improve Gardner impact. Using the impact agent alone (Sample 13) yielded no benefit since good dispersion of the filler in the nylon was apparently lacking. Also, the order of addition of the impact modifier and coupling agent to the filler does not appear to be critical as similar results are obtained, compare Examples 7, 8 and 11. The higher amount of triethanolamine impact modifier in Sample 11 improved impact strength relative to Sample 8.

The tensile strength and flexural modulus which yielded high Gardner impact are presented in Table 3. Surprisingly both of these mechanical properties were improved along with impact relative to the silane treated filler control.

Surprisingly, the hydrolyzed silane treatment (Sample 15) also improved impact by about 20%. The purpose of hydrolyzing is to convert the alkoxy groups of the silane to silanol groups which are more reactive to the mineral surface. This would be expected to improve tensile strength but not necessarily impact strength.

EXAMPLE 3

Table 4 sets forth results from testing additional samples of treated filler which were incorporated into nylon 6 and molded and tested for Gardner impact. These results were not entirely successful inasmuch as difficulty was obtained in melting the nylon which was found to be the result of mechanical error. The end result was that most of the experimental samples have a higher filler content than desired, i.e., greater than 40 wt.% whereas the controls which are the commercial silane treated fillers were present in lower amounts.

However, Sample 6 which was a combination of hydrolyzed silane followed by triethanolamine gave a 45% improvement in impact over the control (Sample 4).

TABLE 4

| SMPL | DESCRIPTION | Wt. % | MEQ | Wt. % | MEQ | % ASH | GARDNER IMPACT (IN-LB) | % C | % H | % N |
|---|---|---|---|---|---|---|---|---|---|---|
| 1 | A-1100 | 1.4 | 6.3 | — | — | 40.8 | 19 | 0.31 | 0.09 | 0.25 |
| 2 | A-1100 | 1.4 | 6.3 | — | — | 36.4 | 20 | 0.31 | 0.09 | 0.25 |
| 3 | A-1100 | 1.4 | 6.3 | — | — | 39.3 | 19 | 0.31 | 0.09 | 0.25 |
| 4 | A-1100 | 1.4 | 6.3 | — | — | 38.4 | 21 | 0.31 | 0.09 | 0.25 |
| 5 | A-1100 | 1.4 | 6.3 | — | — | — | — | 0.31 | 0.09 | 0.25 |
| 6 | A-1100*/TEA** | 1.0 | 4.5 | 0.22 | 1.5 | 38.0 | 29 | 0.23 | 0.08 | 0.27 |
| 7 | A-1100*/TEA* | 1.0 | 4.5 | 0.45 | 3.0 | 41.0 | 16 | 0.37 | 0.09 | 0.23 |
| 8 | A-1100*/TEA | 1.4 | 6.3 | 0.22 | 1.5 | 42.1 | 18 | 0.34 | 0.08 | 0.19 |
| 9 | A-1100/Silane 1 | 1.0 | 4.5 | 0.60 | 2.0 | 43.2 | 14 | 0.34 | 0.10 | 0.24 |
| 10 | A-1100/Silane 2 | 1.0 | 4.5 | 0.49 | 2.0 | 44.0 | 13 | 0.35 | 0.07 | 0.20 |
| 11 | A-1100/Amine 1 | 1.0 | 4.5 | 0.24 | 2.0 | 45.3 | 14 | 0.31 | 0.09 | 0.29 |
| 12 | A-1100/Amine 2 | 1.0 | 4.5 | 0.23 | 2.0 | 44.3 | 15 | 0.30 | 0.08 | 0.26 |
| 13 | A-1100/Amine 3 | 1.0 | 4.5 | 0.18 | 2.0 | 43.6 | 13 | 0.32 | 0.08 | 0.28 |
| 14 | A-1100/silicone oil | 1.0 | 4.5 | 0.30 | — | 45.7 | 5 | 0.09 | 0.05 | 0.14 |
| 15 | Translink 445 | — | — | — | — | — | — | 0.29 | 0.08 | 0.12 |
| 16 | A-1100 + TEA(mixture) | 1.0 | 4.5 | 0.22 | 1.5 | 47.0 | 12 | 0.33 | 0.07 | 0.28 |
| 17 | A-1100* + TEA(mixture) | 1.0 | 4.5 | 0.22 | 1.5 | 45.6 | 13 | 0.39 | 0.10 | 0.20 |
| 18 | Toluenesulfonamide/A-1100 | 0.5 | 3.0 | 1.0 | 4.5 | 43.0 | 16 | 0.45 | 0.06 | 0.24 |
| 19 | Ucarsil EC-1 | 3.0 | — | — | — | 41.5 | 8 | 1.09 | 0.15 | 0.19 |
| 20 | Translink 555 | — | — | — | — | 41.0 | 13 | 0.28 | 0.08 | 0.19 |
| 21 | A-1102### | 1.0 | 4.5 | — | — | 28.3 | 18 | 0.20 | 0.07 | 0.19 |
| 22 | Aminocaproic Acid/A-1100 | 0.26 | 2.0 | 1.0 | 4.5 | — | — | 0.39 | 0.14 | 0.21 |
| 23 | Tolslfon/A-1100 | 0.25 | 1.5 | 1.0 | 4.5 | — | — | 0.35 | 0.07 | 0.22 |
| 24 | Tolslfon/A-1100 | 0.04 | 0.2 | 1.0 | 4.5 | — | — | 0.25 | 0.08 | 0.24 |
| 25 | TEA##/A-1100 | 0.22 | 1.5 | 1.0 | 4.5 | — | — | 0.31 | 0.10 | 0.17 |

Nylon 6 - Capron 8200 HS
Clay filler - Satintone #5 except as noted
Molding Conditions 490-500-450° C., Mold 80° C., 5.6 shot size
Pressure injection 1300 psi back 100 psi
Base clay - Satintone Special
Base clay - Nuopaque
*A-1100 Premixed 50% in 90/10 ethanol + water soln
**TEA = Triethanolamine
Silane 1 - m,p-(Aminoethylaminomethyl)phenyl trimethoxysilane
Silane 2 - (Chloromethyl)phenyltrimethoxysilane
Amine 1 - 2-amino-2-ethyl-1,3-propandiol
Amine 2 - N,N—diethylethanolamine
Amine 3 - 2-amino-2-methyl-1-propanol
MEQ - milliequivalence of reagent 1100 grams of Kaolin
Gardner Impact - ASTM 3029-G (3" Disc) (mean failure energy)
Ucarsil EC-1 - organic silane supplied by Union Carbide Corp.
Nuopaque - calcined Kaolin supplied by Engelhard Corp.

EXAMPLE 4

Various samples of treated filler were prepared by standard V-blender and Welex (high shear) techniques. The fillers were compounded with nylon 6/6 (Dupont Zytel 101). A description of the samples and the Gardner impact of the molded composites are shown in Table 5. Gardner impact, tensile strength and flexural modulus for the samples are shown in Table 6. Compounding of the filled nylon 6,6 was achieved in an American Leistritz LSM 30.34GL twin screw extruder as in Example 1. Barrel temperatures during compounding ranged from about 230° to 265° C.

The example is included for the purpose of candor although it is not believed it accurately reflects the "real world". The nylon obviously contained water which affected the results for both control and experimental samples and as is known in the art, water should not be present when compounding nylon. Although the amount of water was not measured, back pressure during injection molding is an indication of moisture content and as can be seen, the obtained back pressure was only 100 psi whereas normally 150 psi is obtained.

TABLE 5

| SMPL | DESCRIPTION | Wt. % | MEQ | Wt. % | MEQ | % ASH | GARDNER IMPACT (IN-LB) | % C | % H | % N |
|---|---|---|---|---|---|---|---|---|---|---|
| 1 | A-1100 | 1.4 | 6.3 | — | — | 36.1 | 91 | 0.33 | 0.12 | 0.28 |
| 2 | A-1100 | 1.4 | 6.3 | — | — | 36.3 | 82 | 0.33 | 0.12 | 0.28 |
| 2A | A-1100 | 1.4 | 6.3 | — | — | 36.7 | 68 | 0.33 | 0.12 | 0.28 |
| 2B | A-1100 | 1.4 | 6.3 | — | — | 36.7 | 72 | 0.33 | 0.12 | 0.28 |
| 3 | A-1100 | 1.4 | 6.3 | — | — | — | — | 0.33 | 0.12 | 0.28 |
| 4 | A-1100 | 1.4 | 6.3 | — | — | 38.1 | 62 | 0.33 | 0.12 | 0.28 |
| 5 | A-1100 | 1.4 | 6.3 | — | — | 39.3 | 60 | 0.33 | 0.12 | 0.08 |
| 5A | A-1100 | 1.4 | 6.3 | — | — | 38.2 | 61 | 0.33 | 0.12 | 0.28 |
| 6 | A-1100 | 1.4 | 6.3 | — | — | 36.8 | 92 | 0.30 | 0.09 | 0.29 |
| 7 | A-1100 | 1.4 | 6.3 | — | — | 38.0 | 60 | 0.30 | 0.09 | 0.28 |
| 8 | Translink 445 | — | — | — | — | 38.4 | 47 | 0.28 | 0.10 | 0.25 |
| 9 | Translink 445 | — | — | — | — | 41.7 | 31 | 0.28 | 0.10 | 0.25 |
| 10 | A-1100[1] (W) | 1.4 | 6.3 | — | — | 39.3 | 59 | 0.35 | 0.10 | 0.21 |
| 11 | A-1100[2] (W) | 1.4 | 6.3 | — | — | 37.1 | 45 | 0.35 | 0.10 | 0.22 |

TABLE 5-continued

| SMPL | DESCRIPTION | Wt. % | MEQ | Wt. % | MEQ | % ASH | GARDNER IMPACT (IN-LB) | % C | % H | % N |
|---|---|---|---|---|---|---|---|---|---|---|
| 12 | TEA*/A-1100 (W) | 0.22 | 1.5 | 1.0 | 4.5 | 37.9 | 27 | 0.36 | 0.11 | 0.26 |
| 13 | TEA/A-1100 (V) | 0.22 | 1.5 | 1.0 | 4.5 | 37.3 | 75 | 0.26 | 0.07 | 0.27 |
| 14 | TEA/A-1100 (W) | 0.45 | 3.0 | 1.0 | 4.5 | 36.8 | 55 | 0.45 | 0.10 | 0.29 |
| 15 | TEA/P-221 (W) | 0.226 | 1.5 | 1.0 | 4.5 | 38.0 | 68 | 0.31 | 0.09 | 0.21 |
| 16 | TEA/P-221 (V) | 0.22 | 1.5 | 1.0 | 4.5 | 37.0 | 58 | 0.28 | 0.07 | 0.28 |
| 17 | TEA/P-221 (W) | 0.45 | 3.0 | 1.0 | 4.5 | 36.4 | 67 | 0.47 | 0.14 | 0.30 |
| 18 | A-1100/3-Aminophenyl (W) | 1.0 | 4.5 | 0.16 | 1.5 | 31.6 | 53 | 0.32 | 0.08 | 0.21 |
| 19 | Phenol/A-1100 (W) | 0.28 | 3.0 | 1.0 | 4.5 | 36.3 | 42 | 0.38 | 0.09 | 0.18 |
| 20 | 3-Aminophenyl/A-1100 (W) | 0.16 | 1.5 | 1.0 | 4.5 | 36.5 | 25 | 0.31 | 0.07 | 0.18 |
| 21 | A-1100/TEA (W) | 1.0 | 4.5 | 0.22 | 1.5 | — | — | 0.32 | 0.09 | 0.25 |
| 22 | Blend TEA + A-1100[3] (V) | 0.5 | 2.3 | 0.11 | 0.8 | 36.6 | 33 | 0.14 | 0.06 | 0.15 |
| 23 | Blend TEA + A-1100[3] (V) | 0.5 | 2.3 | 0.22 | 1.5 | 36.0 | 38 | 0.18 | 0.05 | 0.16 |
| 24 | A-1100 (W) | 1.4 | 6.3 | — | — | 36.2 | 67 | 0.33 | 0.12 | 0.28 |
| 24A | A-1100 (W) | 1.4 | 6.3 | — | — | 35.6 | 99 | 0.33 | 0.12 | 0.28 |
| 25 | A-1100 (W) | 1.4 | 6.3 | — | — | 35.3 | 82 | 0.33 | 0.12 | 0.28 |

Base Clay Satintone #5; Nylon, Dupont Zytel 101
Molding Conditions 520-520-530° F., Mold 80° C., shot size 5.6
Pressure - injection 1300 psi back 100 psi
*TEA = Triethanolamine
(W) = Sample made in Welex mixer
(V) = Sample made in V-blender
[1]Premixed in ETOH/water
[2]Premixed in water + heated
[3]Premixed separately with TEA and A-1100 and blended
MEQ - milliequivalence of reagent 1100 grams of Kaolin
P-221 - gamma - aminopropyltriethoxysilane (SCM Corporation)

TABLE 6

| SAMPLE # | GARDNER IMPACT[1] (in-lbs) | TENSILE STRENGTH[2] (YIELD-PSI) | FLEXURAL MODULUS[3] (PSI × 10$_3$) |
|---|---|---|---|
| 1 | 91(3.6) | 13100 | 729 |
| 2 | 82(7.5) | 13200 | 754 |
| 2A | 68(3.0) | 13300 | 747 |
| 2B | 72(3.0) | 12600 | 735 |
| 4 | 62(12.4) | 13200 | 781 |
| 5 | 60(1.3) | 13400 | 792 |
| 5A | 61(1.5) | 13200 | 788 |
| 6 | 92(9.5) | 13200 | 764 |
| 7 | 60(2.6) | 13300 | 797 |
| 8 | 47(2.5) | 12700 | 751 |
| 9 | 31(0.5) | 12800 | 805 |
| 10 | 59(1.6) | 13500 | 798 |
| 11 | 45(1.2) | 13200 | 739 |
| 12 | 27(0.4) | 12500 | 783 |
| 13 | 75(8.8) | 13000 | 783 |
| 14 | 55(1.4) | 12700 | 748 |
| 15 | 68(2.8) | 13100 | 775 |
| 16 | 58(1.1) | 13000 | 741 |
| 17 | 67(12.6) | 13000 | 715 |
| 18 | 53(1.0) | 12500 | 719 |
| 19 | 42(1.8) | 12700 | 737 |
| 20 | 25(0.7) | 12700 | 769 |
| 21 | — | — | — |
| 22 | 33(1.7) | 12300 | 745 |
| 23 | 38(1.2) | 12500 | 732 |
| 24 | 67(12.9) | 13200 | 746 |
| 24A | 99(9.8) | 13400 | 742 |
| 25 | 82(4.3) | 13300 | 721 |

[1]ASTM D3029-G
[2]ASTM D638
[3]ASTM D790

EXAMPLE 5

Various treated fillers were incorporated into nylon 6/6 as in Example 4. Gardner impact data as well as flexural modulus and tensile strength of the compositions of the samples are given in Tables 7 and 8.

TABLE 7

| SMPL | DESCRIPTION | Wt. % | MEQ | Wt. % | MEQ | % ASH | GARDNER[1] IMPACT (IN-LB) | % C | % H | % N |
|---|---|---|---|---|---|---|---|---|---|---|
| 1 | A-1100 | 1.4 | 6.3 | — | — | 39.5 | 75 | 0.27 | 0.09 | 0.15 |
| 2 | A-1100 | 1.4 | 6.3 | — | — | 41.5 | 100 | 0.27 | 0.09 | 0.15 |
| 3 | A-1100 | 1.4 | 6.3 | — | — | 37.5 | 62 | 0.27 | 0.09 | 0.15 |
| 4 | A-1100 | 1.4 | 6.3 | — | — | 42.9 | 68 | 0.27 | 0.09 | 0.15 |
| 5 | A-1100 | 1.4 | 6.3 | — | — | 44.8 | 45 | 0.27 | 0.09 | 0.15 |
| 6 | Translink 445 | — | — | — | — | 40.1 | 49 | 0.26 | 0.07 | 0.12 |
| 7 | Translink 445 | — | — | — | — | 41.7 | 22 | 0.26 | 0.07 | 0.12 |
| 8 | A-1100* | 1.0 | 4.5 | — | — | 43.7 | 66 | 0.21 | 0.10 | 0.13 |
| 9 | A-1100/TEA* | 0.8 | 3.6 | 0.22 | 1.5 | 40.9 | 66 | 0.17 | 0.08 | 0.09 |
| 10 | A-1100 | 0.8 | 3.6 | — | — | 43.5 | 54 | 0.16 | 0.07 | 0.11 |
| 11 | A-1100 | 1.0 | 4.5 | — | — | 43.5 | 59 | 0.21 | 0.07 | 0.11 |
| 12 | A-1100 | 1.2 | 5.4 | — | — | 43.0 | 69 | 0.26 | 0.08 | 0.17 |
| 13 | TEA/A-1100 | 0.22 | 1.5 | 1.0 | 4.5 | 41.5 | 59 | 0.25 | 0.08 | 0.12 |
| 13A | TEA/A-1100 | 0.22 | 1.5 | 1.0 | 4.5 | 42.6 | 74 | 0.25 | 0.08 | 0.12 |
| 14 | A-1100/TEA | 1.0 | 4.5 | 0.22 | 1.5 | 43.4 | 42 | 0.31 | 0.09 | 0.13 |
| 15 | A-1100/TEA | 1.0 | 4.5 | 0.45 | 3.0 | 43.4 | 75 | 0.39 | 0.12 | 0.18 |
| 16 | A-1100/TEA | 1.0 | 4.5 | 0.45 | 3.0 | 44.1 | 73 | 0.39 | 0.12 | 0.18 |
| 17 | A-1100 | 0.8 | 3.6 | — | — | 44.8 | 44 | 0.31 | 0.09 | 0.13 |
| 18 | A-1100 | 1.0 | 4.5 | — | — | 45.0 | 64 | 0.21 | 0.10 | 0.13 |

TABLE 7-continued

| SMPL | DESCRIPTION | Wt. % | MEQ | Wt. % | MEQ | % ASH | GARDNER[1] IMPACT (IN-LB) | % C | % H | % N |
|------|-------------|-------|-----|-------|-----|-------|---------------------------|------|------|------|
| 19 | A-1100 | 1.2 | 5.4 | — | — | 44.5 | 61 | 0.26 | 0.08 | 0.17 |
| 20 | A-1100* | 1.0 | 4.5 | — | — | 45.9 | 59 | 0.21 | 0.10 | 0.13 |
| 21 | A-1100 | 1.4 | 6.3 | — | — | 43.0 | 84 | 0.27 | 0.09 | 0.15 |

Base Clay Satintone #5 Nylon-Zytel 101
*Base Clay Satintone Special
Molding Conditions 520-520-530° F., Mold 80° C., shot size 5.6
Pressure - injection 1300 psi back 100 psi
TEA = Triethanolamine
MEQ - milliequivalence of reagent 1100 grams of Kaolin
Gardner Impact[1] - ASTM 3029-G (3" Disc) (mean failure energy)

TABLE 8

| SAMPLE # | ASH (WT. %) | GARDNER[1] IMPACT (IN/LBS) | FLEXURAL[2] MODULUS ($10^3$-PSI) | TENSILE[3] STRENGTH ($10^3$-PSI) |
|----------|-------------|----------------------------|----------------------------------|----------------------------------|
| 1  | 39.5 | 75  | 856  | 13.6 |
| 2  | 41.5 | 100 | 888  | 13.9 |
| 3  | 37.6 | 62  | N/A  | N/A  |
| 4  | 42.9 | 68  | 906  | 14.2 |
| 5  | 44.8 | 45  | 970  | 14.4 |
| 6  | 40.1 | 49  | 787  | 13.2 |
| 7  | 41.7 | 22  | 834  | 13.0 |
| 8  | 43.7 | 66  | 921  | 13.3 |
| 9  | 40.9 | 66  | N/A  | N/A  |
| 10 | 43.5 | 54  | 974  | 14.3 |
| 11 | 43.5 | 59  | 963  | 14.2 |
| 12 | 43.0 | 69  | 960  | 14.2 |
| 13 | 41.5 | 49  | 914  | 13.7 |
| 13A| 42.6 | 74  | 928  | 14.3 |
| 14 | 43.4 | 42  | 969  | 14.4 |
| 15 | 43.4 | 75  | 955  | 14.3 |
| 16 | 44.1 | 73  | 999  | 14.4 |
| 17 | 44.8 | 44  | 1002 | 14.5 |
| 18 | 45.0 | 64  | 1015 | 14.7 |
| 19 | 44.5 | 61  | 1015 | 14.6 |
| 20 | 45.9 | 59  | 1002 | 14.1 |
| 21 | 43.0 | 84  | 959  | 14.5 |

Gardner ASTM - 3029-G
Flexural ASTM - D790
Tensile ASTM - D638

Again as in Example 5, difficulties were encountered in obtaining a desirable nylon 6/6 melt. Accordingly, impact values for even the controls are still significantly lower than would be expected. However, it can be seen that at the higher levels of the triethanolamine impact modifier (Samples 15 and 16) the Gardner impact is substantially improved over the controls (Sample 5). Similarly, tensile strength and flexural modulus were also better or equivalent to the control for these samples.

EXAMPLE 6

In this example, a procedure is set forth for providing a filler which has use in improving the impact strength of a polyamide.

Wollastonite (1400 g) is loaded into an 8 quart Patterson-Kelly twin shell liquid-solids blender equipped with a high speed intensifier bar. The mineral is then agitated for one minute. Liquid triethanolamine (5.6 ml) is added by syringe over a one minute time period through the intensifier bar. 13.8 ml of an aminopropyl silane, A-1100 from Union Carbide, is added over a one minute time period. The sample is then allowed to mix for three more minutes. The sample is then collected and pulverized and is dried overnight at 140° F.

The coated fillers are compounded into Nylon 6,6 as described in Example 4.

EXAMPLE 7

The following example describes a method by which a kaolin filler is treated and compounded with polyethylene terephthalate to improve the impact strength thereof.

A kaolin filler (Satintone #5, Engelhard) and melted Acryloid KM-330, an acrylate based interpolymer described in U.S. Pat. No. 4,096,202 from Rohm and Haas are mixed in a high shear Wellex blender to provide 0.5 wt.% of said impact modifier on the kaolin filler. Subsequently, A-1100 (gamma aminopropyl triethoxysilane from Union Carbide) is added in liquid form to provide 1.4 wt.% of the silane coupling agent on the filler. The sample is collected and pulverized through a 0.020 screen and dried overnight at 140° F.

The coated filler and polyethylene terephthalate are extrusion compounded using the twin screw, co-rotating extruder, (34 mm) screw as in Example 4. Extrusion temperatures are from about 230° to 275° C. The dried extruded pellets are molded using a reciprocating screw injection molder at processing temperatures of 230°-275° F. with a mold temperature of 80° C.

What is claimed is:

1. A moldable plastic composition comprising a thermoplastic polyamide matrix and an inorganic filler dispersed within said matrix, said filler having applied thereon separate deposits of a coupling agent and an impact modifier for said polyamide comprising a phenol or triethanolamine.

2. The plastic composition of claim 1 wherein said coupling agent comprises organo functional silanes.

3. The plastic composition of claim 1 wherein said filler comprises a clay.

4. The plastic composition of claim 3 wherein said clay is a fine particle size calcined kaolin.

5. The plastic composition of claim 2 wherein said filler comprises kaolin.

6. The plastic composition of claim 2 wherein said silane coupling agent is an amino functional silane.

7. The plastic composition of claim 5 wherein said coupling agent comprises an amino functional silane.

8. The plastic composition of claim 1 wherein said impact modifier is deposited onto the surface of said filler and said coupling agent is provided on the surface of said deposit of impact modifier.

9. The plastic composition of claim 1 wherein said coupling agent is provided on the surface of said filler and said impact modifier is provided on the surface of said coupling agent.

10. A filler for improving the impact strength of a thermoplastic polyamide comprising a particulate clay filler having applied thereon separate deposits of a coupling agent and an impact modifier for improving the impact strength of said polyamide comprising a phenol or triethanolamine.

11. The filler of claim 10 wherein said coupling agent comprises a an amino functional silane.

12. A method of improving the impact strength of a moldable plastic composition comprising incorporating into a polymeric matrix a coated filler which has been prepared by coating the filler with two treating agents, one of said treating agents comprising a coupling agent and, the other of said treating agents comprising n impact modifier for said polymeric matrix, said filler being prepared by coating on the surface thereof said impact modifier in liquid form, thereby forming a first coating deposit of said impact modifier treating agent on the filler and subsequently applying as a liquid said coupling agent to form a second coating deposit, said polymeric matrix being selected from the group consisting of polyamides, polyalkylene terephthalates, and wholly aromatic polyesters obtained by the reaction of aromatic dicarboxylic acids or derivatives thereof with a bisphenol.

13. The method of claim 12 wherein said coupling agent comprises an amino functional silane.

14. The method of claim 12 wherein said filler comprises clay.

15. The method of claim 14 wherein said clay is kaolin.

16. The method of claim 15 wherein said coupling agent is an amino functional silane.

17. The method of claim 12 wherein said polymeric matrix comprises a polyamide, said coupling agent comprises an amino functional silane and said impact modifier comprises triethanolamine or a phenol.

18. The method of claim 12 wherein said filler is incorporated into said polymeric matrix by dispersing said coated filler into the melted polymeric matrix.

19. The method of claim 18 wherein said coated filler is dispersed into said melted polymeric matrix within an extruder means.

20. The filler of claim 10 which is a kaolin clay.

21. The filler of claim 11 which is a kaolin clay.

22. The filler of claim 21 wherein said impact modifier comprises triethanolamine.

23. A filler for improving the impact strength of a thermoplastic or thermosetting polymer comprising an inorganic particulate filler having applied thereon a first deposit of an impact modifier for improving the impact strength of said thermoplastic or thermosetting polymer and a second subsequently applied deposit of a coupling agent.

24. The filler of claim 23 wherein said coupling agent comprises an amino functional silane.

25. The filler of claim 23 wherein said impact modifier comprises a phenol or triethanolamine for improving the impact strength of a polyamide polymer.

26. The filler of claim 24 wherein said impact modifier comprises triethanolamine.

27. The plastic composition of claim 1 wherein said impact modifier comprises triethanolamine.

28. The method of claim 17 wherein said impact modifier comprises triethanolamine.

29. A moldable plastic composition comprising a thermoplastic polymeric matrix and an inorganic filler dispersed within said matrix, said filler having applied thereon a first deposit of an impact modifier for said polymeric matrix and a second separately applied deposit of a coupling agent provided on the surface of said deposit of impact modifier, said thermoplastic polymer being selected from the group consisting of polyamides, polyalkylene terephthalates, and wholly aromatic polyesters obtained by the reaction of aromatic dicarboxylic acids or derivatives thereof with a bisphenol.

30. The plastic composition of claim 29 wherein said thermoplastic polymer is a polyamide.

31. The plastic composition of claim 29 wherein said polymeric matrix comprises polyalkylene terephthalates.

32. The plastic composition of claim 31 wherein said polyalkylene terephthalate comprises polyethylene terephthalate or polybutylene terephthalate.

33. The plastic composition of claim 29 wherein said polymeric matrix is a wholly aromatic polyester formed by the reaction of an aromatic dicarboxylic or derivatives thereof with a bisphenol.

34. A method of improving the impact strength of a moldable plastic composition comprising incorporating into a polyamide polymeric matrix a coated filler which has been prepared by coating the filler with two treating agents, one of said treating agents comprising an amino functional silane coupling agent and, the other of said treating agents comprising an impact modifier for said polymeric matrix comprising triethanolamine or a phenol, said filler being prepared by coating on the surface thereof one of said treating agents in liquid form, thereby forming a first coating deposit of said treating agent on the filler and subsequently applying as a liquid the other of said treating agents to form a second coating deposit.

35. The method of claim 34 wherein said coupling agent comprises triethanolamine.

* * * * *

UNITED STATES PATENT AND TRADEMARK OFFICE
CERTIFICATE OF CORRECTION

PATENT NO. : 4,740,538
DATED : April 26, 1988
INVENTOR(S) : D. Sekutowski

It is certified that error appears in the above—identified patent and that said Letters Patent is hereby corrected as shown below:

Column 6, line 38, insert: --wherein-- before $R_1$.

Column 21, line 4, delete: [a].

Column 21, line 10, delete: [n], replace with: --an--.

Signed and Sealed this

Ninth Day of May, 1989

Attest:

DONALD J. QUIGG

Attesting Officer

Commissioner of Patents and Trademarks